Dec. 4, 1923.

H. CAMERON

SCALE

Original Filed Nov. 2, 1917

1,475,930

Witnesses

Inventor
Hugh Cameron
By Dyer & Taylor
Attorneys

Patented Dec. 4, 1923.

1,475,930

UNITED STATES PATENT OFFICE.

HUGH CAMERON, OF BROOKLYN, NEW YORK, ASSIGNOR, BY MESNE ASSIGNMENTS, TO ROBERT D. KENT, OF PASSAIC, NEW JERSEY.

SCALE.

Original application filed November 2, 1917, Serial No. 199,842. Divided and this application filed September 6, 1919. Serial No. 322,157.

*To all whom it may concern:*

Be it known that I, HUGH CAMERON, a citizen of the United States, and a resident of the borough of Brooklyn, county of Kings, city and State of New York, have invented a certain new and useful Improvement in Scales, of which the following is a specification.

My invention relates to automatic scales wherein the weight placed upon the platform or pan, as the case may be, will automatically bring the scale beam to a balance at some point within the travel of the scale levers and by means of which the travel of the levers and consequently the weight of the object will be registered on a dial in order that the reading of the weight may be seen at a glance, and wherein no manual manipulation of the compensating weight is required.

The object of my invention is to provide a simple, cheap and efficient device, wherein the weight may be read at one reading and at a glance thereby obviating calculation, thus saving time and insuring accuracy.

Another object is to provide a scale of the automatic type in which the necessity for accurate leveling of the scale is dispensed with without affecting the accuracy of the scale.

A further object is the production of a device wherein the liability of error is reduced to a minimum.

A still further object is to provide a device wherein springs, tapes and rapidly moving compensating weights are eliminated.

These and further objects will more fully appear in the following specification and the accompanying drawing considered together or separately.

All levers change in power as they travel above and below a horizontal line and in beam scales this change in power is neutralized by a compensating weight, which is moved to increase the power of the beam or lever as it moves or is moved upward and to decrease the power when it moves below the horizontal.

In the ordinary platform scale this compensation is accomplished by a weight which is moved manually along the beam until it is balanced and the position of the weight, relatively to graduations on the beam, will indicate the weight on the platform.

In automatic scales the compensating weight is usually in the form of weighted levers resembling somewhat the ball levers of steam engine governors. The weight levers are connected up to the beam by means of gear wheels, belts, springs, and other complicated mechanism and as the weight levers themselves change in power as they travel toward or away from the horizontal they must themselves be compensated, all of which tends to complicate such devices and to increase the liability to error.

By my invention the compensating weight is on the beam. The number of moving parts is reduced to a minimum. All moving parts are on anti-friction bearings and the travel of the beam and movement of the compensating weight are in perfect ratio.

I have illustrated one embodiment of my invention in the accompanying drawings in which like parts in all of the several figures are designated by similar characters of reference, and in which—

Figure 1:
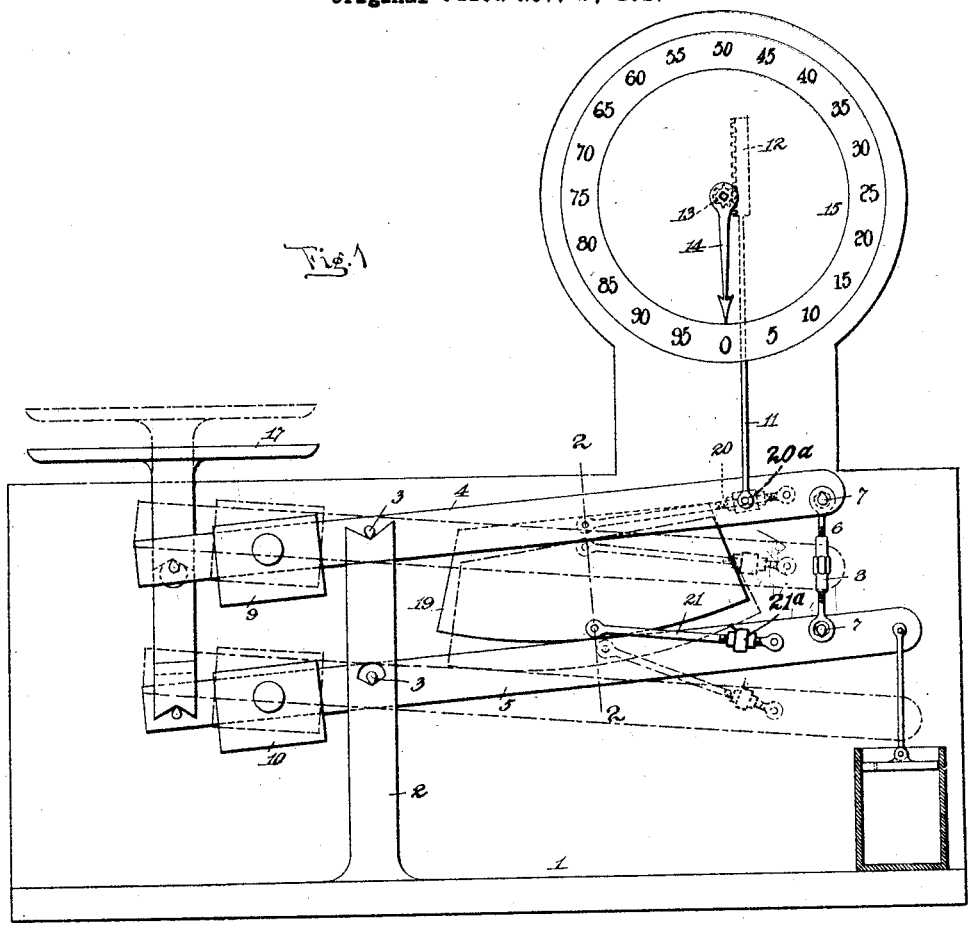
Figure 1 is a side elevation, partly in section, of one embodiment of my invention.
Figure 2:
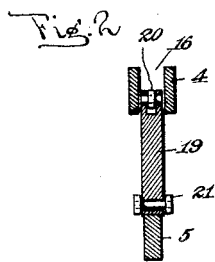
Figure 2 is a transverse section on the line 2—2 of Figure 1.

In carrying out my invention I provide a base 1 which, in the embodiment of the invention illustrated, is that of a counter scale. Extending upward from the base are two standards 2. In the standards, on knife edge bearings 3, are pivoted two members 4 and 5. In Fig. 1 these members are illustrated as being levers of the first class.

The long ends of the members 4 and 5 are loosely connected together by means of a shackle 6 which engages the beam levers on knife edges 7. The members 4 and 5 constitute the scale beam. The shackle is divided and its two parts are secured together by means which will permit the ends of the members to be adjusted toward or away from each other. In the embodiment of the invention illustrated, the bearing portions of the shackle are secured together by a nut 8 having right and left hand threads, whereby a turnbuckle is formed.

The members forming the beam are extended at that side of the bearings 3 opposite the shackle, and the member 4 is provided with an adjustable weight 9. The member 5 carries a similar weight 10. These weights are employed to balance the members 4 and 5, so that they may normally lie in the desired position.

Pivoted to one of the members 4 or 5 is a rod 11 which carries at its upper end a spur rack 12 adapted to engage a spur pinion 13, which in turn carries a hand or pointer 14, which cooperates with a suitably calibrated dial 15.

In the embodiment of the invention illustrated the beam member 4 is formed of two elements rigidly secured together with a recess 16 between them. The beam member 5 is a single element and is located below and in alinement with the space 16. Carried on the short arm of the member 4 is a pan 17 on which the article or articles to be weighed may be placed.

Carried on the member 5 is a weight 19 sufficiently heavy to compensate for the pull of the scale leverage system when a body is placed upon the pan 17. The engaging surface of the weight is in the form of a segment of a circle and the weight is adapted to have a rolling movement relatively to the member 5. The upper edge of the compensating weight 19 plays within the recess 16 in the beam member 4, and is connected to the member 4 by means of a link bar 20.

The lower edge of the weight has pivoted thereto a link 21 the opposite end of which is pivoted to the member 5. The link 21 may comprise two members, as illustrated, or it may be a single element secured to one side of the weight and to one side of the member 5. When the distance between the pivot 3 of the member 5 and the pivot 7 of the shackle 6 on the beam member 4 varies as the beam is moved by the weight of the contents of the pan 17, the weight will be prevented from sliding on the beam member 5 but will be caused to roll on the member whereby friction will be reduced to a minimum. The link bar 20 and link 21 may be provided with means, such as turnbuckles 20$^a$ and 21$^a$ for adjusting their lengths.

The beam preferably cooperates with a damping device to prevent excessive vibration of the pointer 14. A dash pot 22 is illustrated in connection with the beam member 5 but it is to be understood that any other damping device may be employed, and in any suitable position.

Instead of making the beam member 4 with a recess such as 16 therein, the member may be a single element and the vertical dimension of the weight 19 may be such that its upper edge will lie below the member 5.

While the invention is illustrated in connection with a counter scale, it is to be understood that the same may be applied to a platform scale by attaching the long end of the beam 4—5 to the linkage system of such a form of scale. The beam will then be a lever of the third class instead of the first class as before described.

The operation is as follows:

When the scale is set up the shackle 6 is adjusted to bring the beam members into parallelism with the bearing edges of the points 7, 7 exactly the same distance apart as the edges of the points 3, 3. The poises 9 and 10 are adjusted to balance the beam, and the mechanism attached thereto, at the bottom of its travel, as shown in dotted lines in Fig. 1, with the pointer 14 indicating 0 on the dial. A body of known weight is now placed on the pan or platform as the case may be. The test weight will lower the short end of the beam and raise the long end. As the long end of the beam travels upward the distance between the pivot 3 of the beam member 5 and the pivot 7 of the member 4 will be gradually increased. The link bar 20 will move the weight 19 away from the fulcrums of the beam, and if the various parts of the device are properly coordinated the movement of the weight along the beam will be in perfect ratio with the pointer which will travel around the dial and come to rest at the character indicating the weight of the body on the pan. If the weight of the test body is not indicated by the pointer the operator will know that the movement of the compensating weight is too much or too little and the scale is fast or slow as the case may be. As the travel of the weight is increased by lengthening the link bar 20 and decreased by shortening it, it will be only necessary to adjust the length of the bar until the pointer indicates the weight of the test body.

For a finer adjustment the free ends of the beam members 4 and 5 may be adjusted relatively to each other by means of the shackle 6 and such movement will move the weight toward or away from the fulcrums of the beam as the ends are moved toward or away from each other.

If, when the test weight is removed from the pan, the pointer does not stop at 0 the weight may be moved to bring the pointer to that point, thus bringing the beam, rack, and pinion movements into perfect ratio. The device is now in condition for operation and will correctly indicate the weight of any object, within its limits, which may be placed on the pan.

If the divice is to be used with a platform scale the draught pivot may be placed on either side of the fulcrum and its position relatively to the fulcrum may be varied to suit lever systems of different multiplications.

The invention is not limited to a scale beam comprising two beam members, but any number other than one may be employed.

This application is a division of an application for patent filed by me on November 2, 1917, Serial Number 199,842.

In accordance with the provisions of the patent statutes I have described the principle of my invention, together with the apparatus which I now consider to represent the best embodiment thereof, but I desire to have it understood that the apparatus shown is merely illustrative, and that the invention may be carried out in other ways.

Having now described my invention, what I claim and desire to secure by Letters Patent is:—

1. A scale comprising a plurality of pivoted beam members, a weight carried by one of the members and having a rolling contact therewith, and means under control of the members for moving the point of contact toward or away from the fulcrum of the supporting member.

2. A scale comprising a plurality of pivoted beam members, a weight carried by one of the members and having a rolling contact therewith, and means under control of the members for automatically moving the point of contact toward or away from the fulcrum of the supporting member.

3. A scale comprising a plurality of pivoted beam members, a weight carried by one of the members and having a rolling contact therewith, pivoted connections between the members and weight, and means under control of the members for moving the point of contact toward or away from the fulcrum of the supporting member.

4. A scale comprising a plurality of pivoted beam members, a weight carried by one of the members and having a rolling contact therewith, pivoted connections between the members and weight, and means under control of the members for automatically moving the point of contact toward or away from the fulcrum of the supporting member.

5. A scale comprising a plurality of pivoted beam members, a weight supported by one of the members and having a rolling contact therewith, means under control of the members for moving the point of contact toward and away from the fulcrum of the supporting member, and means for adjusting the last mentioned means.

6. A scale comprising a plurality of pivoted beam members, a weight supported by one of the members and having a rolling contact therewith, means under control of the members for automatically moving the point of contact toward and away from the fulcrum of the supporting member, and means for adjusting the last mentioned means.

7. A scale comprising a plurality of pivoted beam members, means for applying a load to the members, a weight carried by one of the members and having a rolling contact therewith, and means operated by the movement of the members for automatically moving the point of contact of the weight and its supporting member for balancing the members.

8. A scale comprising a plurality of pivoted beam members, means for securing the members in parallelism, a compensating weight having a rolling contact with one of the members, and a connection between the weight and another of the members.

9. A scale comprising a plurality of pivoted adjustable beam members, means for securing the members in parallelism, a compensating weight having a rolling contact with one of the members, and a connection between the weight and another of the members.

10. A scale comprising a plurality of pivoted beam members, means for securing the members in parallelism, a compensating weight having a rolling contact with one of the members, and an adjustable connection between the weight and another of the members.

11. A scale comprising a plurality of pivoted adjustable beam members, means for securing the members in parallelism, a compensating weight having a rolling contact with one of the members, and an adjustable connection between the weight and another of the members.

12. A scale having an indicator and comprising a plurality of independently pivoted members, means for securing the members in parallelism, a compensating weight having a rolling connection with one of the members, a connection between the weight and another of the members, and connections between one of the members and the indicator.

13. A scale having two pivoted beam members, means for securing the members in parallelism, a weight resting upon and supported by one of the members, connections between the weight and the other member whereby movement of the member will cause the weight to roll on the member on which it rests whereby its point of contact therewith will be moved toward or away from the fulcrum of the member.

14. A scale comprising two independently pivoted members, means for securing the members in parallelism, a weight resting upon and supported by one of the members, connections between the weight and the other member whereby movement of the members will cause the weight to roll on the member on which it rests whereby its point of contact therewith will be moved toward or away from the fulcrum of the member.

15. A scale comprising a plurality of independently pivoted members, means for securing the members in parallel relation, a weight resting upon one of the members and having a rolling contact therewith, a pivotal connection between the weight and the supporting member, and a pivotal connection between the weight and another member.

This specification signed and witnessed this 4th day of September, 1919.

HUGH CAMERON.

Witnesses:
A. E. RENTON,
CHARLES C. COLING.